… ……

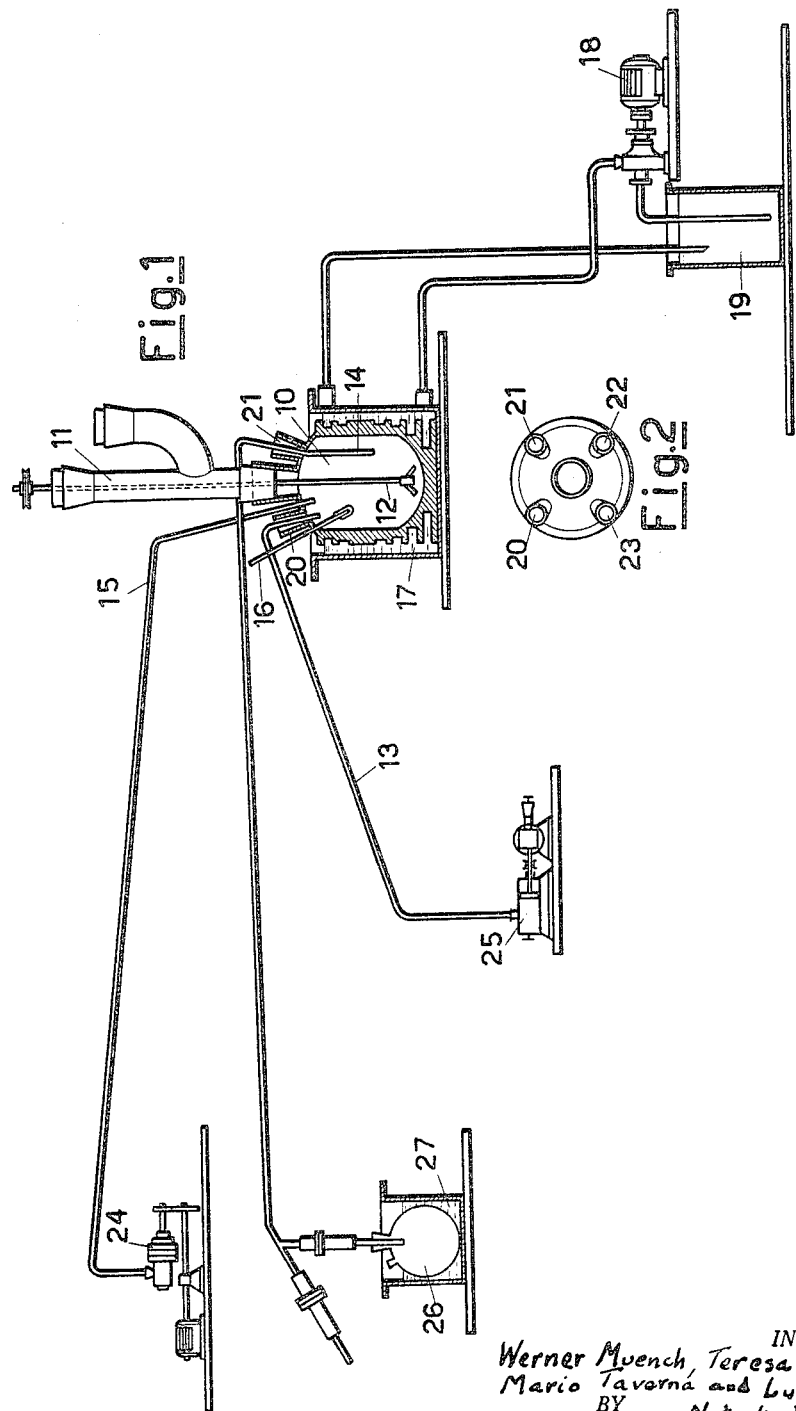

United States Patent Office
3,167,543
Patented Jan. 26, 1965

3,167,543
METHOD FOR THE CONTINUOUS PRODUCTION OF CAPROLACTAM
Werner Muench, Cesano Maderno, and Teresa Argenziano and Mario Taverna, Milan, Italy, and Luigi Notarbartolo, deceased, late of Milan, Italy, by Enza Pascalino, administratrix, and Paola Notarbartolo, heiress, both of Milan, Italy, assignors to Snia Viscosa Società Nazionale Industria Applicazioni Viscosa S.p.A., Milan, Italy, a company of Italy
Filed Nov. 2, 1962, Ser. No. 235,161
Claims priority, application Italy, Nov. 22, 1961, 21,025/61
16 Claims. (Cl. 260—239.3)

In a prior patent application by the same applicants (Patent No. 3,022,291), a general method was described for the preparation of caprolactam by nitrosation of cyclohexyl compounds having a tertiary carbon atom, in particular of hexahydrobenzoic acid and its functional derivatives, cyclohexyl aryl ketones, dicyclohexyl ketone, etc. One object of the present invention is to improve the general method described in the aforesaid application.

Another object of the invention is to provide a continuous process for the preparation of caprolactam.

Another object is to ensure that this process will produce the crude caprolactam end-product in high yield and good purity.

Other objects and advantages will appear from the following specification.

According to the invention, nitrosation is initially carried out, in the presence of oleum containing 23–60% of free sulfur trioxide, at a temperature of about 90–100° C. and preferably at about 100° C., with the time of residence of the reaction mixture in the nitrosation zones, i.e., in the reactor (or set of reactors) comprised within 1 and 15 minutes, preferably between 4 and 6 minutes.

By free $SO_3$ is meant the $SO_3$ present in the composition regardless of whether it is there as such, or bound to sulfuric acid (pyrosulfuric acid), or to nitrosylsulfuric acid (nitrosylsulfuric anhydride).

In view of the strongly exothermic nature of the nitrosation reaction with these compounds (hereinafter, the reaction will also be referred to as "lactamization") it is necessary to provide means for cooling the reaction mass.

This may be accomplished, for example, by external or internal cooling of the reaction vessel itself, possibly by continuous evaporation of a volatile liquid, or by circulating the reaction mass through a suitable cooler located outside the actual reaction vessel.

Preferably, the nitrosation vessel is continuously charged with a solution of hexahydrobenzoic acid or another starting material in oleum, this solution having been previously prepared in order to dissipate the heat of solution outside the nitrosation zone.

Since, in the latter case, nitrosation continues also in the cooler, the cooler too, is a part of the nitrosation zone, and the residence time includes residence in the cooler.

The initial molar ratio of hexahydrobenzoic acid to the nitrosation agent, calculated as NO, is preferably kept between 1.8 and 2.2, i.e., an excess of the former is used. The molar ration of free sulfur trioxide to nitrosation agent, expressed as above, is kept between 0.4 and 1.2, preferably between 0.65 and 0.85. These ratio are based on flow rates per unit time for the different reagents under steady-state conditions.

Nitrosylsulfuric acid is the preferred nitrosation agent, but it may be substituted by other nitrosation agents, even if formed in situ.

Other preferred characteristics and embodiments, and the advantages of the invention will be better understood from the following examples of its practice. These refer to the attached drawing, where one type of lactamization apparatus is schematicaly illustrated, in sectional and top view, respectively, in FIGURES 1 and 2.

The percentages given in the specification are by weight.

*Example 1*

The apparatus schematically shown in FIG. 1 is used. Number 10 indicates a steel reactor, externally fitted with cooling fins, which in the present example has a capacity of 900 cc. It is fitted with a central neck 11, which receives the shaft of an agitator 12, and with four additional necks (20, 21, 22, 23) of which only the first two can be seen in FIG. 1, but of which all are shown in FIG. 2. These necks receive, respectively, a nitrosylsulfuric acid charging tube 13, a dip leg 14 for discharging the reaction product, a tube 15 for charging hexahydrobenzoic acid and oleum, and a thermometer 16. The reactor is immersed in a coolant, for example, an oil bath 17. Pump 18 circulates the oil from an oil tank 19. 24 and 25 indicates pumps, a gear pump and a piston pump, respectively, which respectively feed the hexahydrobenzoic acid-oleum mixture and the nitrosylsulfuric acid to the reactor. 26 indicates a receiver for the reaction product, which is cooled with an ice water bath 27, and from which the product and $CO_2$, which is partially emulsified with the reaction mass, are continuously discharged (see drawing).

With this apparatus, it is possible to regulate the quantity of product which always remains in the reactor, and thus the residence time, by adjusting the distance of dip leg 14 from the bottom of the reactor.

A mixture of hexahydrobenzoic acid and oleum containing 40% of free sulfur trioxide is prepared separately by slowly adding the oleum to molten hexahydrobenzoic acid, with agitation and external cooling with ice and salt. The internal temperature must not exceed 40° C. The weight ratio of hexahydrobenzoic acid to oleum in the solution also depends on the composition of the nitrosylsulfuric acid solution.

The solution of nitrosylsulfuric acid in sulfuric acid is prepared separately, for example by absorption of $N_2O_3$ in 22% oleum; the final solution contains 43% of $NOHSO_4$, 1.5% of free $SO_3$ and 2.4% of $HNO_3$.

The initial reactor charge is formed by fixing the temperature of bath 17 at 75° C., placing in reactor 10 73.2 g. of the hexahydrobenzoic acid-oleum solution and feeding 60 g. of nitrosylsulfuric acid solution at such a rate that, at a constant temperature of bath 17, the internal temperature gradually increases to 95–98° C. At this point, continuous operation is begun.

Simultaneously, 738 g./hr. of hexahydrobenzoic acid-oleum solution and 601 g./hr. of nitrosylsulfuric acid solution are fed to the reactor, the bath temperature being kept at 50–60° C. Initially, the internal temperature then rises to 100° C. but in a few minutes levels off at 95° C. From the start of continuous operation, the reaction product is discharged regularly through dip leg 14 because of slight pressure caused by carbon dioxide formed during lactamization.

The reaction product is continuously treated according to the following method, which also applies to the examples which follow, being essentially identical in all cases. The parts of reagent are by weight and refer to 100 parts of acid solution discharged from reactor 10.

The mass leaving the reactor is continuously removed from the container in which it was collected, in this case flask 27 and is hydrolyzed by addition of 100 parts of acid solution and 200 parts of ice. The hydrolyzed mass is then extracted with 300 parts of cyclohexane. Cyclohexane extracts from the mass the excess of unreacted hexahydrobenzoic acid; the cyclohexane solution is easily separated from the aqueous, acidic caprolactam solution by decantation. The extraction may be carried out by means of any suitable apparatus, for example in a separatory funnel. Extraction could be effected simultaneously with hydrolysis, by feeding together water and cyclohexane.

The acidic solution is then neutralized, for example with gaseous ammonia, until a pH of 7–7.5 is reached. Caprolactam is obtained by counter-current extraction of the neutralized solution with 280 parts of methylene chloride. The extraction may be performed in any suitable apparatus.

Distillation of methylene chloride yields crude caprolactam of 95–98% strength. The ammonium sulfate solution obtained contains small amounts of methylene chloride and various by-products.

The method described in the foregoing example gives a caprolactam yield (calculated as pure caprolactam) of 86–97%, based on hexahydrobenzoic acid and 80.4% based on nitrosylsulfuric acid.

*Example 2*

A nitrosylsulfuric acid solution, having the composition $NOHSO_4$: 57.5%; $H_2SO_4$ (100%): 41.5%; free $SO_3$: 1%, is prepared separately.

Fresh hexahydrobenzoic acid and a solution of hexahydrobenzoic acid in cyclohexane, obtained by extraction with cyclohexane of the hydrolyzed reaction mixture as described in Example 1, are taken from suitable storage tanks and are also separately mixed. The resulting solution of hexahydrobenzoic acid in cyclohexane is treated with 30% oleum in an extractor consisting of a cooled vessel. In this manner, oleum extracts hexahydrobenzoic acid from the cyclohexane solution, and by cooling the vessel, the heat of solution of hexahydrobenzoic acid in oleum is absorbed. Cyclohexane is separated to be reused in the next extraction of caprolactam, as described in Example 1. During the operation, the temperature must not exceed 30° C.

In the quantitative experiment herein described, 4.7 kg./hr. of hexahydrobenzoic acid and a solution of 4.8 kg./hr. of the same acid in 20 kg./hr. of cyclohexane are mixed. Extraction is effected with 6.2 kg./hr. of 30% oleum. All of the cyclohexane is discharged from the extractor to be reused in the extraction of caprolactam, while the solution of 9.5 kg./hr. of hexahydrobenzoic acid in oleum is fed to the reactor; 8.2 kg./hr. of nitrosylsulfuric acid is also fed to the reactor.

Cooling is accomplished by circulating the reaction mixture through a heat exchanger so that the temperature in the reactor does not exceed 100° C. and is preferably maintained between 95 and 100° C. The carbon dioxide formed in the reaction (1.6 kg./hr.) is discharged into the atmosphere. The solution, which is continuously discharged from the reactor, contains 4.8 kg./hr. of unreacted hexahydrobenzoic acid, 3.9 kg./hr. of caprolactam, 0.4 kg./hr. of reaction by-products and 13.2 kg./hr. of sulfuric acid. This solution is treated as described in Example 1, i.e. it is neutralized, the unreacted hexahydrobenzoic acid is extracted with cyclohexane, and the remaining acid caprolactam solution is neutralized and extracted.

For the extraction, 20 kg./hr. of cyclohexane is used, corresponding to the amount discharged from the extractor in which the solution of hexahydrobenzoic acid in oleum was prepared. The hexahydrobenzoic acid solution in cyclohexane is recycled and reused in the mixer as specified above. The yield of pure caprolactam is 94% on hexahydrobenzoic acid and 93% based on nitrosylsulfuric acid.

*Example 3*

The apparatus and procedure described in Example 2, but with different reagent flow rates, are used as follows.

In the mixer, 4.55 kg./hr. of hexahydrobenzoic acid is mixed with a cyclohexane solution resulting from 20 kg./hr. of cyclohexane and 4.95 kg./hr. of hexahydrobenzoic acid. The mixture obtained is extracted with 6.5 kg./hr. of 27% oleum. The separated cyclohexane, 20 kg./hr., is reused in the extraction of hexahydrobenzoic acid from the hydrolyzed reaction product, as described in the preceding examples.

The reactor is charged with the oleum-hexahydrobenzoic acid solution obtained from the extractor and also with 7.850 kg./hr. of a solution having the following composition: nitrosylsulfuric acid: 60%; $H_2SO_4$ (100%): 38.5%; free $SO_3$: 0.5%. During lactamization, 1.6 kg./hr. of a carbon dioxide is formed, and the resulting acid solution is hydrolyzed with 27 kg./hr. of $H_2O$. Unreacted hexahydrobenzoic acid is extracted, followed by neutralization and extraction of caprolactam with methylene chloride, as described in Example 1.

*Example 4*

An apparatus similar to that used in Example 1 and shown in FIGURES 1 and 2 is employed, except that an additional gear pump is used to pump cyclohexane into tube 15 of the apparatus shown, through which, together with the hexahydrobenzoic acid-oleum solution, it enters the reactor.

The procedure used, to the point where continuous operation is started, is the same as in Example 1; the initial charge is of the same composition as described in Example 1, since the same flow rates are used for hexahydrobenzoic acid-oleum and the nitrosation mixture. Continuous processing is carried out as in Example 1, by simultaneously feeding 1050 g./hr. of hexahydrobenzoic acid-oleum solution, 872 g./hr. of nitrosylsulfuric acid solution and, with the aid of the added pump and through tube 15, 218 g./hr. of cyclohexane, keeping the bath temperature at 70° C. Evaporated cyclohexane may be discharged and collected separately, or it may be left in admixture with the reaction products and separated by decantation. By the procedure described in Example 1, the yield of caprolactam (calculated as pure caprolactam) is 87.3% of the theoretical, based on hexahydrobenzoic acid and 86.6% of the theoretical, based on nitrosylsulfuric acid.

The invention has been illustrated by a few examples of its practice. It is, however, not limited by these, since it can be modified and adapted in many ways by those skilled in the art. Thus, changes can be made in the starting materials, the nitrosation agents, the molar ratio within the limits indicated, the type of apparatus used, the cooling system etc. as well as in the manner in which the reaction products are worked up.

We claim:

1. In a process for the preparation of caprolactam by nitrosation, in the presence of sulfuric acid and free sulfur trioxide, of a cyclohexyl compound having a tertiary carbon atom and selected from the group consisting of hexahydrobenzoic acid and its functional derivatives, the improvement consisting in effecting the nitrosation continuously and substantially in the temperature range between 90 and 100° C., with time of residence of the reaction mixture in the nitrosation zone between 1 and 15 minutes.

2. A process according to claim 1, in which the residence time is between 4 and 8 minutes.

3. A process according to claim 1, in which the molar ratio of free sulfur trioxide to nitrosation agent, expressed as NO, is between 0.4 and 1.2.

4. A process according to claim 1, in which the molar ratio of the said compound, calculated as hexahydrobenzoic acid, to the nitrosation agent, calculated as NO, is between 1.8 and 2.

5. A process according to claim 1, in which the reaction temperature is controlled by circulating the mixture being nitrosated through a cooler, which thus constitutes a part of the nitrosation zone.

6. A process according to claim 5 in which the nitrosation zone is fed with a mixture of hexahydrobenzoic acid and oleum which has been previously prepared, in order to dissipate the heat of solution outside the nitrosation zone.

7. A process according to claim 6, in which the hexahydrobenzoic acid-oleum solution is obtained by adding oleum to molten hexahydrobenzoic acid.

8. A process according to claim 6, in which the solution of hexahydrobenzoic acid and oleum is obtained by extracting a cyclohexane solution of hexahydrobenzoic acid with oleum.

9. A process according to claim 8, in which the cyclohexane, freed of hexahydrobenzoic acid by extraction with oleum, is used to extract hexahydrobenzoic acid from the reaction product, preferably after hydrolyzing the latter, and the resulting solution of hexahydrobenzoic acid in cyclohexane is reused in the step involving extraction with oleum.

10. A process according to claim 1, in which caprolactam is extracted from the nitrosation product by hydrolyzing the said product with water, then, after extraction of unreacted hexahydrobenzoic acid, neutralizing the resulting acid solution and, with an organic solvent, extracting from its caprolactam.

11. A process according to claim 1, in which the molar ratio of free sulfur trioxide to nitrosation agent, expressed as NO, is between 0.65 and 0.85.

12. In a process for the preparation of caprolactam by nitrosation of hexahydrobenzoic acid with nitrosylsulfuric acid, in the presence of sulfuric acid and free sulfur trioxide, the improvement consisting in preparing a mixture of hexahydrobenzoic acid and oleum containing 23 to 60% of free sulfur trioxide, preparing a separate mixture of nitrosylsulfuric acid in sulfuric acid, placing the hexahydrobenzoic acid-oleum solution in a reactor, and then feeding the nitrosylsulfuric acid mixture into the reactor, and, after the internal temperature in the reactor reaches 95° C. to 98° C., continuously feeding hexahydrobenzoic acid-oleum mixture and nitrosylsulfuric acid mixture into the reactor while maintaining the internal temperature in the reactor at from 90° C. to 100° C., and discharging the reaction product continuously from the reactor.

13. In a process according to claim 12, the improvement consisting in preparing the mixture of hexahydrobenzoic acid and oleum by slowly adding oleum to molten hexahydrobenzoic acid while maintaining the temperature in the mixture at not in excess of 40° C.

14. A process according to claim 12, in which the initial reactor charge consists of approximately 73.2 g. of the hexahydrobenzoic acid-oleum mixture and 60 g. of the nitrosylsulfuric acid mixture, and in which during continuous feeding the hexahydrobenzoic acid-oleum mixture is fed at approximately the rate of 738 to 1050 g. per hour and the nitrosylsulfuric acid mixture is fed approximately at the rate of 601 to 872 g. per hour.

15. A process according to claim 12, in which the hexahydrobenzoic acid mixture is prepared by first mixing hexahydrobenzoic acid and a solution of this acid in cyclohexane, and then extracting the cyclohexane with oleum.

16. A process according to claim 15 in which 4.55 to 4.7 kg. per hour of hexahydrobenzoic acid and a solution of 4.8 to 4.95 kg. per hour of the same acid in 20 kg. per hour of cyclohexane are mixed, and the mixture is extracted with 6.2 kg. per hour of 30% oleum to 6.5 kg. per hour of 27% oleum.

References Cited in the file of this patent

UNITED STATES PATENTS

| | | |
|---|---|---|
| 2,926,074 | Berger | Feb. 23, 1960 |
| 2,929,690 | Bennett et al. | Mar. 22, 1960 |
| 3,022,291 | Muench et al. | Feb. 20, 1962 |
| 3,060,173 | Von Schick et al. | Oct. 23, 1962 |